W. S. WORTHINGTON.
Evaporating Pan.

No. 18,830. Patented Dec. 8, 1857.

UNITED STATES PATENT OFFICE.

WILLIAM S. WORTHINGTON, OF NEWTOWN, NEW YORK.

IMPROVEMENT IN CONSTRUCTION OF SALT-PANS.

Specification forming part of Letters Patent No. 18,830, dated December 8, 1857.

*To all whom it may concern:*

Be it known that I, W. S. WORTHINGTON, of Newtown, in the county of Queens and State of New York, have invented a new and useful Improvement in Evaporating-Pans for the Manufacture of Salt; and I do hereby declare that the following is a full, clear, and exact description of the same, reference being had to the accompanying drawings, making part of this specification, in which—

Figure 1:
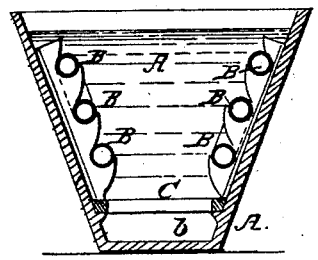
Figure 2:
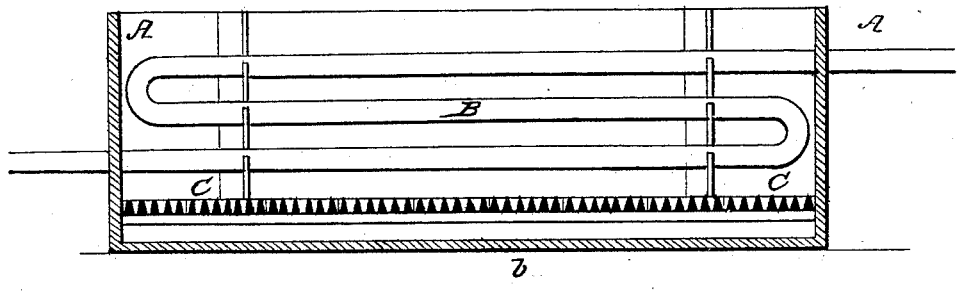

Figure 1 is a transverse vertical section of an evaporating-pan with my improvement. Fig. 2 is a longitudinal vertical section of the same.

Similar letters of reference indicate like parts in both figures.

This invention has for its object the separation from the salt of what is termed the "bitterings," consisting of carbonate of lime and other impurities which are precipitated from the brine before crystallization commences. The ordinary method of separating or abstracting the bitterings is to provide each pan or kettle with a shallow tray or dish of sufficient size to cover the bottom of the pan which receives the bitterings as they subside, and which, after they have subsided, is lifted out of the pan or above the surface of the brine therein; but this method is liable to the objection that the agitation of the brine produced by raising the tray or dish causes the bitterings to be stirred up, and a portion of them to be washed from the tray or dish and retained in the brine and again precipitated, and no provision is made for the abstraction of this portion.

This invention consists in fitting the pan with a movable grating or perforated false bottom which is supported at a suitable distance from the bottom of the pan, so that the bitterings as they subside will pass through it. After their subsidence the bitterings are allowed to remain at the bottom of the pan during the process of crystallization, and the crystals of salt are received upon the grating or false bottom, so that when the evaporating process is completed the salt can be dug out of the pan without disturbing or removing the bitterings, which can be dug out on the removal of the grating or false bottom.

To enable others skilled in the art to make and use my invention, I will proceed to describe its construction and operation.

In carrying out my invention I propose generally to heat the brine by steam-pipes arranged within the pan, and to use a pan of great length with a steam-boiler at each end and pipes running in opposite directions, so that the temperature may be as nearly as possible equal from one end to the other.

A is the pan, and B B are the steam-pipes, the pan having its sides inclined outward toward the top, so that by arranging the steam-pipes near the sides of the pan room may be left between them for the removal of the grating or perforated false bottom.

C C is the grating or perforated false bottom, made in pieces or sections, and supported upon ledges cast on the sides of the pan at such distance from the bottom $b$ of the pan that there will be just space enough between it and the bottom to contain the bitterings, which distance will vary according to the amount of foreign matter in the brine, and can be readily determined by experiment. The evaporation is conducted in the usual manner, with the exception that what is termed the "clearing"—*i. e.*, the removal of the bitterings immediately after their subsidence—is omitted. When the evaporation has been completed, the salt is raked or dug out from above the grating or perforated bottom, which is afterward taken up, and the bitterings are raked or otherwise removed from the bottom.

What I claim as my invention, and desire to secure by Letters Patent, is—

The employment within a brine-evaporating pan of a grating or perforated false bottom, C C, substantially as and for the purpose herein specified.

WILLIAM S. WORTHINGTON.

Witnesses:
W. TUSCH,
JOHN W. J. JACKSON.